(12) United States Patent
Botchek

(10) Patent No.: US 7,487,372 B2
(45) Date of Patent: Feb. 3, 2009

(54) REMOTE POWER SENSING FOR HARD DISK BRIDGE CONTROLLER

(75) Inventor: Robert C. Botchek, Brookfield, WI (US)

(73) Assignee: Tableau, LLC, Waukesha, WI (US)

( * ) Notice: Subject to any disclaimer, the term of this patent is extended or adjusted under 35 U.S.C. 154(b) by 495 days.

(21) Appl. No.: 11/343,406

(22) Filed: Jan. 31, 2006

(65) Prior Publication Data

US 2007/0180278 A1    Aug. 2, 2007

(51) Int. Cl.
*G06F 1/26* (2006.01)
(52) U.S. Cl. .................. 713/300; 713/330; 713/340
(58) Field of Classification Search ................ 713/300, 713/310, 323, 324, 330, 340
See application file for complete search history.

(56) References Cited

U.S. PATENT DOCUMENTS

| 6,766,394 | B1 * | 7/2004 | Shimura et al. | 710/100 |
| 2002/0188792 | A1 * | 12/2002 | Stryker et al. | 710/305 |
| 2002/0199048 | A1 * | 12/2002 | Rabinovitz | 710/100 |
| 2003/0188203 | A1 * | 10/2003 | Park | 713/300 |
| 2004/0107358 | A1 * | 6/2004 | Shiakallis | 713/200 |
| 2005/0105265 | A1 * | 5/2005 | Petrov et al. | 361/685 |

* cited by examiner

*Primary Examiner*—Dennis M Butler
(74) *Attorney, Agent, or Firm*—Sylke Law Offices, LLC; C. Thomas Sylke

(57) ABSTRACT

A remote power sensing system for a hard disk bridge coupled to a drive bay uses a power sensor connecting a bridge to an energization control in the drive bay. The power sensor can be a cable or the like to provide a power detection signal to the bridge. The drive bay energization control selectively provides power to the drive bay (for example, by a key switch or the like). Energization of the drive bay may also energize a drive bay device such as a fan that also functions as an energization proxy. The power sensor connects the bridge to the energization proxy so that energization of the drive bay can be detected via the energization proxy and power sensor. When the sensor detects power provided to the drive bay, the bridging function of the bridge is enabled.

11 Claims, 5 Drawing Sheets

REMOTE POWER SENSING FOR HARD DISK BRIDGE CONTROLLER

BACKGROUND

1. Technical Field

The present invention relates generally to information storage devices used with digital computers and, more particularly, to the use of storage interface bridges in conjunction with removable storage device assemblies.

2. Description of Related Art

Numerous computer applications require the storage and retrieval of large quantities of data, the bulk of which is stored on computer hard disks. Frequently, the amount of data to be stored exceeds the capacity of hard disks which are permanently attached to a computer; or the need for portability precludes the permanent attachment of hard disks to the primary or host computer.

In order to address the demand for portable hard disk storage, the computer industry has developed a number of schemes by which hard disks can be coupled to and removed from computers. On the one hand, certain computer interfaces, protocols, and associated software drivers have been developed which recognize and respond to the dynamic attachment and removal of devices including hard disks (that is, coupling and decoupling without the need for cycling through de-energizing and re-energizing/re-booting the device and/or host computer). IEEE 1394, also commonly known as FireWire, and SBP-2 are examples of one such interface and protocol, respectively. USB (Universal Serial Bus) and its related Mass Storage Class Protocol are each another example of such an interface and protocol, respectively. Hereinafter, interfaces, protocols and associated drivers which support the dynamic attachment and removal of devices including hard disks will be referred to collectively as "hot-swap interfaces."

On the other hand, manufacturers also have developed physical mounting assemblies which facilitate the attachment and removal of computer hard disks. A component of such assemblies, sometimes referred to as a "bay," is permanently mounted within a computer or disk storage enclosure. A second component of such assemblies, sometimes referred to as a "sled," slides in and out of the bay as needed. The sled serves as a protective mount for a hard disk, and the hard disk may be permanently or temporarily mounted in the sled. An energization switch and/or other energization control, such as a mechanical key switch or the like, is often incorporated in the bay or sled. When engaged, this energization control simultaneously prevents the physical removal of the sled from the bay and energizes the hard disk mounted within the sled. Conversely, disengaging the switch de-energizes the hard disk, disables operation of the device and allows physical removal of the sled. A bay and its corresponding sled can be referred to collectively as a "drive bay."

Drive bays typically present the same hard disk interface to the computer as is presented by the hard disk itself. Integrated/Intelligent Drive Electronics (IDE) and Serial Advanced Technology Attachment (SATA) are two examples of such hard disk interfaces, which are well known to those skilled in the art. Although drive bays are intended to facilitate the attachment and removal of IDE and SATA hard disks, the IDE and SATA disk interfaces (and the software drivers which control them) are not generally designed to support dynamic attachment and removal (that is, hot-swapping). Thus, use of most physical drive bays is limited to scenarios in which the entire primary/host computer is power-cycled or rebooted in order to recognize the attachment or removal (that is, coupling or de-coupling) of the hard disks mounted within the drive bays. Clearly, this greatly limits the flexibility and utility of removable hard disk storage.

A class of products called "bridges" have been used to translate between one or more hot-swap interfaces of a host computer and one or more IDE or SATA hard disk interfaces of a drive bay or the like. These bridges are most typically implemented as printed circuit board (PCB) assemblies which, along with a hard disk, are permanently mounted within a portable enclosure. The enclosure presents a hot-swap interface to a host computer, internally translating requests from the host computer to the format required by the IDE or SATA hard disk attached to the bridge. This has generally been a very successful solution and IEEE 1394 and USB storage devices are widely deployed.

Certain manufacturers have gone so far as to integrate such bridge functionality directly into specially built drive bays, thus allowing the drive bay itself present a hot-swap interface to the host computer. Unfortunately, the bridge PCB assemblies required to make this feasible are highly specialized, being mechanically and electrically limited to accommodate a specific drive bay design. As such, there is little choice with such integrated bridge/drive bay designs, often leaving no options for specific features or characteristics as may be required by individual applications. Moreover, the design of such integrated bridge/drive bay designs often precludes the coexistence of more than one such bridge/drive bay on a given hot-swap interface.

Portable bridges also have been developed and are in wide use, such as those manufactured and sold by Tableau, LLC. These devices require a power and operational scheme that ensures that both the drive bay and bridge are energized and the bridging function of the bridge enabled, which typically requires separate device activation by a technician by engaging the switch on the drive bay and enabling the bridge function of the bridge. Where multiple drive bays are to be accessible to a bridge, the power switches must be managed by the technician/user to ensure proper operation of the configuration/array.

Systems, methods and techniques that provide a simple means for connecting and hot-swapping various devices of this type would represent a significant advancement in the art. Also, systems, methods and techniques that allow a hard disk bridge to sense energization of a drive bay without the need for separate activation by a technician or the like likewise would represent a significant advancement in the art.

BRIEF SUMMARY

A remote power sensing system for a hard disk bridge coupled to a drive bay uses a power sensor connecting the bridge to an energization control in the drive bay. The power sensor can be a cable or the like with signal processing such as a bridge rectifier, voltage divider, etc. to provide a power detection signal to the bridge. The drive bay energization control selectively provides power to the drive bay (for example, by a key switch or the like). Energization of the drive bay also energizes one or more devices that also can function as energization proxies within the drive bay, such as a fan unit or similar device. The power sensor connects the bridge to an energization proxy so that energization of the drive bay can be detected via the energization proxy and power sensor. When the sensor detects power provided to the drive bay, the bridging function of the bridge is enabled.

The bridge can employ one or more programmable devices and a bridge chip set having one or more bridge chips, each of which is configured to connect a hard disk to a host computer.

Hard disks usable with the present invention can include IDE and/or SATA disks, but the type of hard disk usable with the present invention is not limited solely to these interface types. The power sensor can be a cable having a first segment that connects the bridge to a fan unit power source (such as a power jack in the drive bay) and a second segment that connects the fan unit power source to the fan unit. Methods for energizing a hard disk detection device according to the present invention couple a drive bay to a detection device (for example, a bridge) using a power sensor. The drive bay is monitored using the power sensor and the bridging function of the detection device is enabled after the drive bay has been energized. In some embodiments, monitoring of the drive bay can include monitoring for energization of the drive bay and monitoring for the presence of a hard disk in the drive bay.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

As noted above, a bridge or other, similar device is used to translate between a host computer or the like and one or more hard disks that typically are housed in one or more drive bays, thus allow connection between a hard disk (for example, a hard disk implementing IDE, SATA or SCSI) and a primary and/or host computer interface (for example, using FireWire/ 1394 or USB, as described above and known to those skilled in the art). While embodiments of the present invention are illustrated and explained herein in connection with such specific devices, protocols, interfaces, etc., those skilled in the art will understand that the scope of the invention extends beyond these exemplary systems and configurations.

Figure 1:
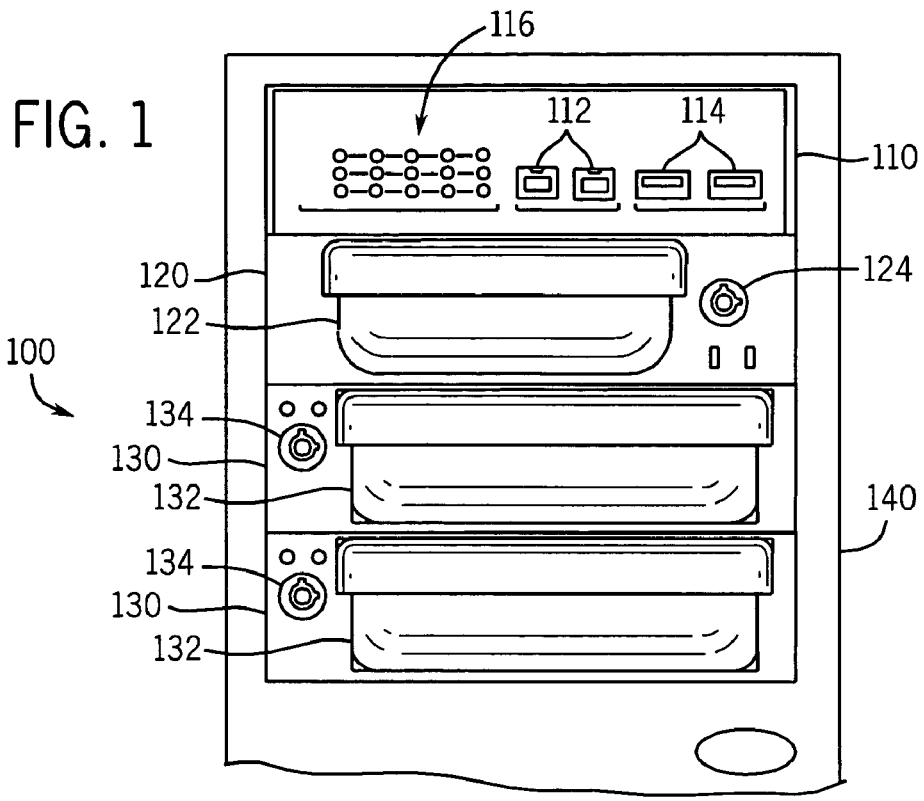
FIG. 1 is a front perspective view of a bridge and multiple drive bays.

FIG. 1 shows a typical array 100 having a bridge 110 coupled to an IDE drive bay 120 and two SATA drive bays 130. The phrases "coupled to" and "connected to" and the like are used herein to describe a connection between two devices, elements and/or components and are intended to mean coupled either directly together, or indirectly, for example via one or more intervening elements or via a wireless connection, where appropriate. IDE drive bay 120 has a sled 122 that can slide in and out of the drive bay 120 to permit access to a hard disk housed therein, for example to replace an inserted hard disk with a different hard disk. IDE drive bay 120 is controlled by a key switch 124 that is engaged and disengaged by a key operated by a user, as is well known to those skilled in the art. Similarly, SATA drive bays 130 have sleds 132 and key switches 134 that operate in an analogous fashion. Key switches 124, 134 can activate further energization control(s) in each drive bay 120, 130 to provide power to the drive bay for operation, including power for any devices operating within the drive bay. Such energization controls are standard components and are not shown in detail.

Figure 2:
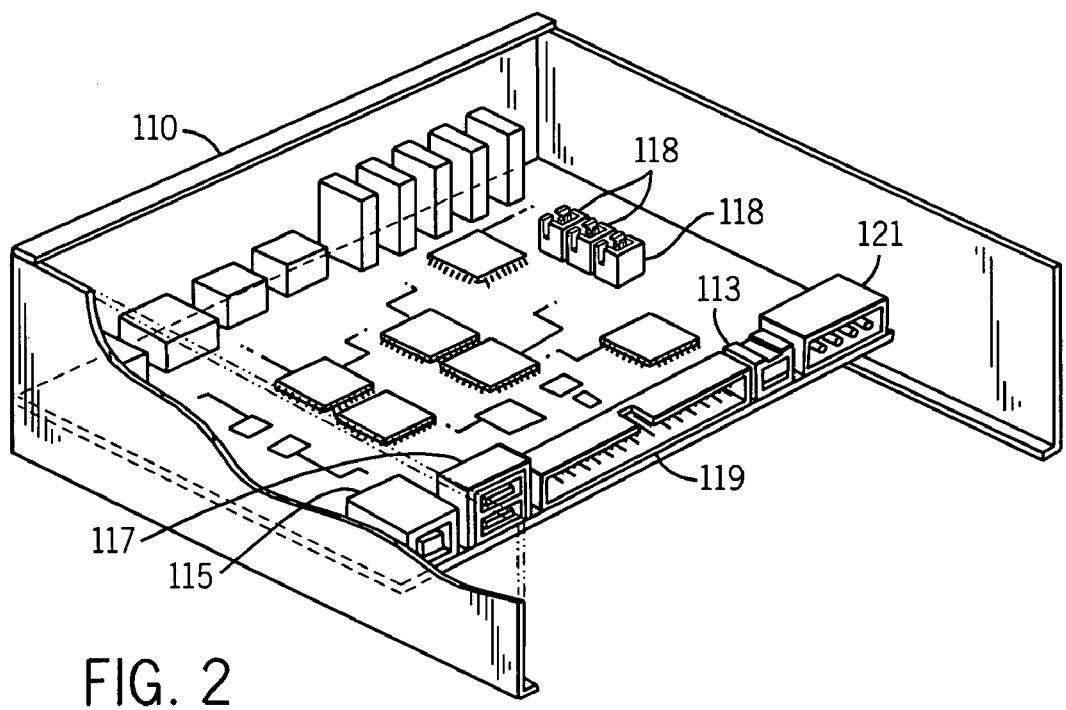
FIG. 2 is an interior view of a bridge usable with embodiments of the present invention.

Bridge 110 can include a FireWire hub having one or more front ports 112 and/or an active USB hub having one or more front ports 114, as desired. Indicator lights 116 can be presented to a user to assist in assessing control and operation of the bridge 110. In FIG. 1, bridge 110 and drive bays 120, 130 are housed in a cabinet or other suitable housing 140, though such an arrangement is a matter of choice for a user. The internal structure of bridge 110 can include whatever components are needed for the desired operation of the bridge 110, including a bridge controller that provides power to or otherwise enables the bridging function and operation of the bridge. FIG. 2 partially illustrates the internal structure of bridge 110, which includes three remote power sensor connectors 118. Connectors 117 for connecting SATA drive bay connectors 117 and an IDE connector 119 are provided, as shown in FIG. 2. A FireWire connector 113 is provided to connect the bridge to the host computer. USB connector 115 provides an alternate USB connection to the host computer. Finally, a power connector 121 is provided to allow the bridge 110 to be connected to a power source in the host computer.

Figure 3:
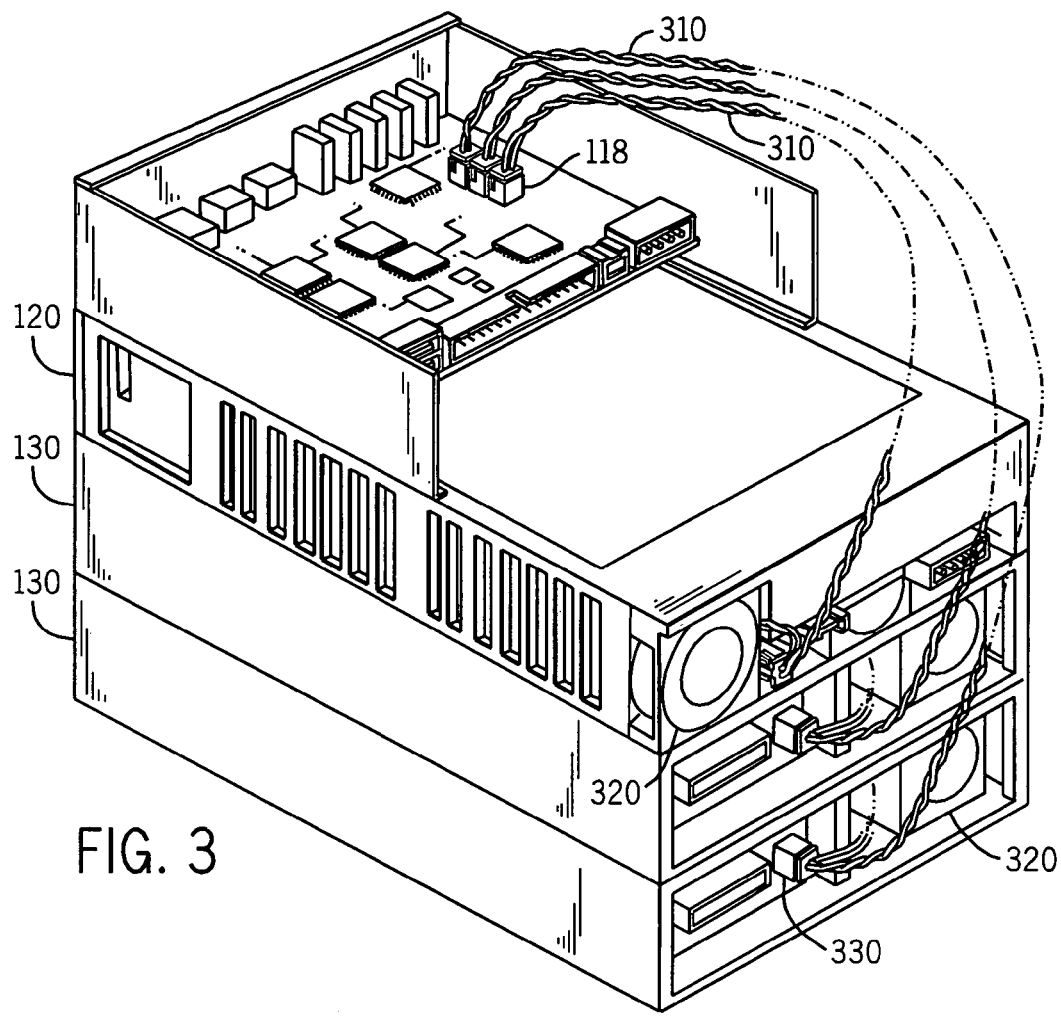
FIG. 3 is a rear view of a bridge and multiple drive bays implementing one or more embodiments of the present invention.
Figure 4:
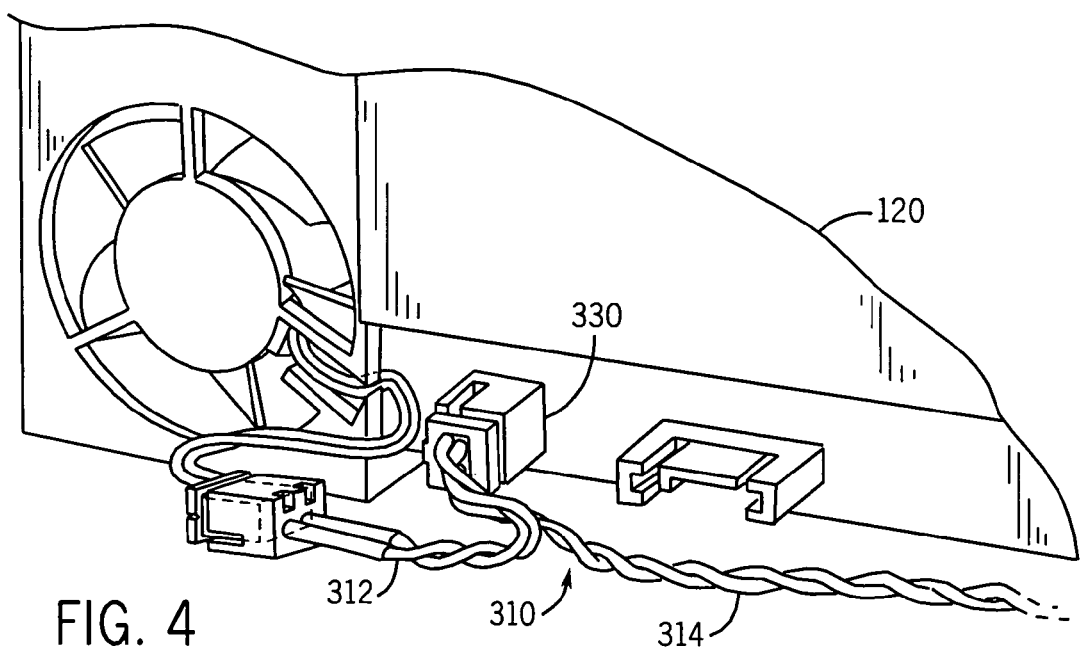
FIG. 4 is a detailed view of a power sensor cable connection to a drive bay.

FIGS. 3 and 4 illustrate physical connections between the bridge 110 and drive bays 120, 130. A twisted pair 310 (also referred to herein as a "power sensor" and/or a "cable") is used to connect each drive bay to the connectors 118 of bridge 110. Each cable 310 is connected to a drive bay in a manner that allows the bridge 110 to sense when a given drive bay has been energized/activated by an energization control of the drive bay. As will be appreciated by those skilled in the art, cables 310 may be twisted pairs, as illustrated, or any other connection that is appropriate for use in connection with embodiments of the present invention. In some embodiments of the present invention, the power sensor cable can sense a power source activation directly. In other embodiments, detection is done via an energization proxy, which is provided power when the drive bay is provided power (for example, after energization of the drive bay by a key switch). In FIGS. 3 and 4, for example, cables 310 are connected to a drive bay fan unit 320, which functions as an energization proxy in some embodiments of the present invention.

FIG. 4 shows a detailed view of the connection between a cable 310 and the fan unit 320 of IDE drive bay 120. As will be appreciated by those skilled in the art, analogous connection of a SATA drive can be achieved using a configuration analogous to that used with IDE drive bays. In standard systems not using the present invention, the fan 320 is connected to a power source such as a connector 330. In the embodiment of the present invention shown in FIG. 4, cable 310 provides a unique connection between connector 330, fan 320 and bridge 110. Connector 330, which is connected to the drive bay energization control, energizes fan 320 whenever the IDE drive bay 120 is energized. As configured in FIG. 4, cable 310 still transmits power to fan 320 via cable segment 312. Cable segment 314, however, provides a bridge function on-off signal (that is, enabling or disabling the bridge function) to bridge 110.

Figure 5:
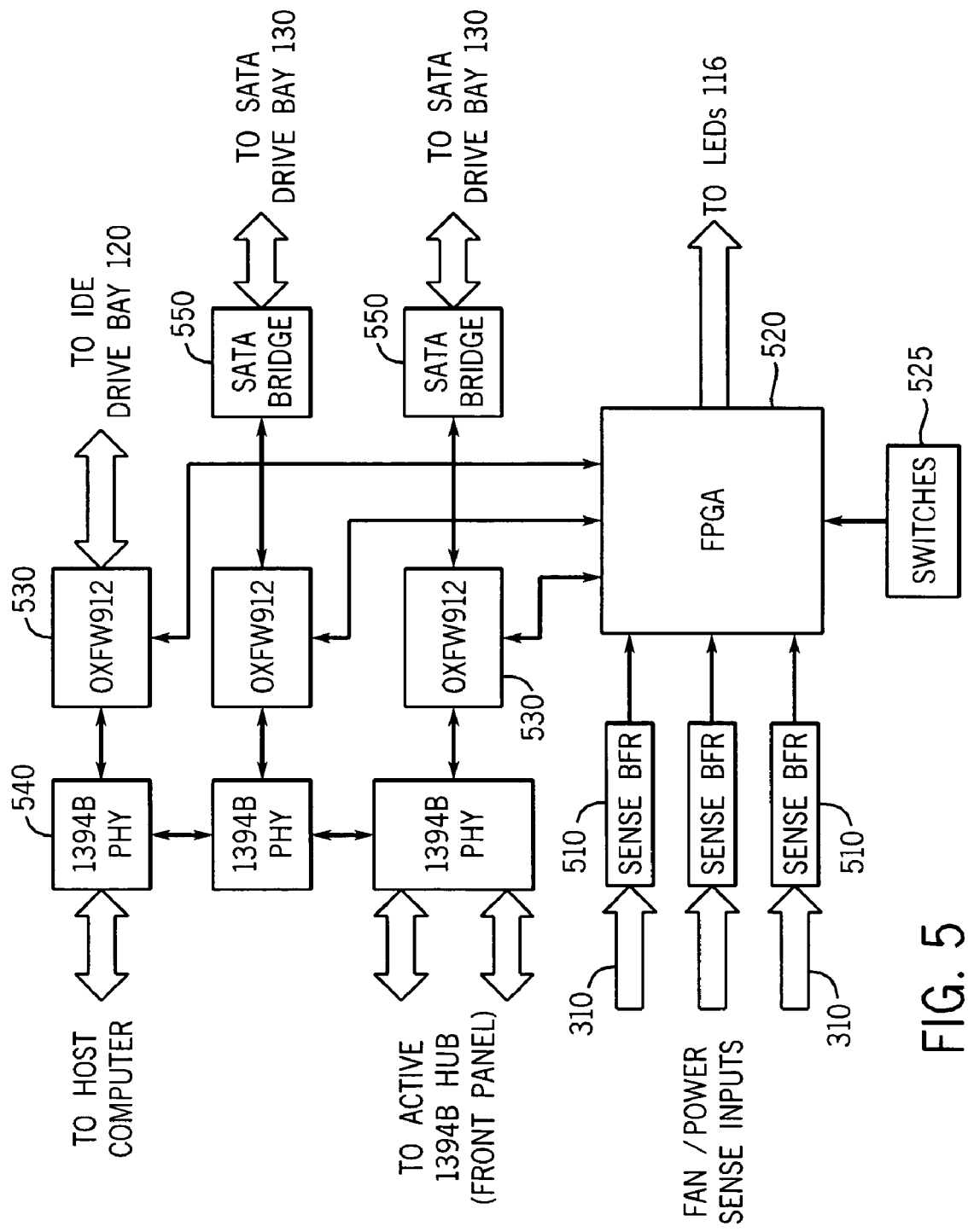
FIG. 5 is a block diagram of a bridge according to one or more embodiments of the present invention.

Some of the internal operational structure of bridge 110 in one embodiment of the present invention is shown in FIG. 5. Each cable 310 is connected to a suitable sensing buffer 510 which provides a power sense input to a controller such as an FPGA or other programmable device 520. PLD 520 can be controlled by one or more switches 525 on bridge 110 to allow user control of the bridge 110. FPGA 520 also provides indicator signals to the indicator lights 116 of the bridge 110 and/or any other suitable indicia to allow a user to monitor operation of the bridge 110.

FPGA 520 also communications with a number of individual bridge chips 530. These devices 520, 530 can communicate in any appropriate manner, including providing one another with information regarding power sensing in any connected drive bays. Bridge chips 530 can be any suitable devices, depending on the user's intended use and operation. One example of a bridge chip usable in connection with embodiments of the present invention is the OXFW912 chip made and sold by Oxford Semiconductor Ltd. In the configuration of FIG. 5, each chip 530 serves as a bridge between the host computer and the various drive bays 120, 130 connected to the bridge 110. In the case of SATA disk drive bays 130, a SATA bridge 550 is interposed between each bridge chip 530 and the SATA drive bay 130, as will be appreciated by those skilled in the art.

Figure 6:
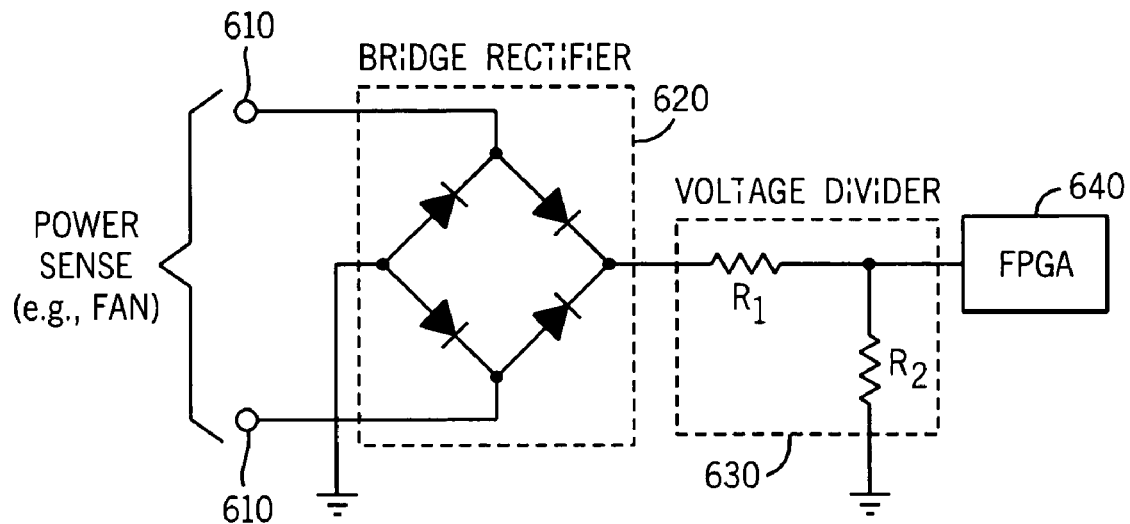
FIG. 6 is schematic of a power sensor according to one or more embodiments of the present invention.

Each cable 310 can be configured to provide whatever specific capabilities are needed in a given setting. FIG. 6 illustrates one embodiment of a cable 310 in which a pair of power sensing contacts 610 are connected to an FPGA 640 via a bridge rectifier 620 and a voltage divider 630. Rectifier 620 obviously ensures proper orientation of contacts 610 to prevent damage to or malfunctioning of the system. Likewise voltage divider 630 ensures that the input voltage to FPGA 640 is within the limits required by the FPGA 640 for safe and proper operation.

Figure 7:
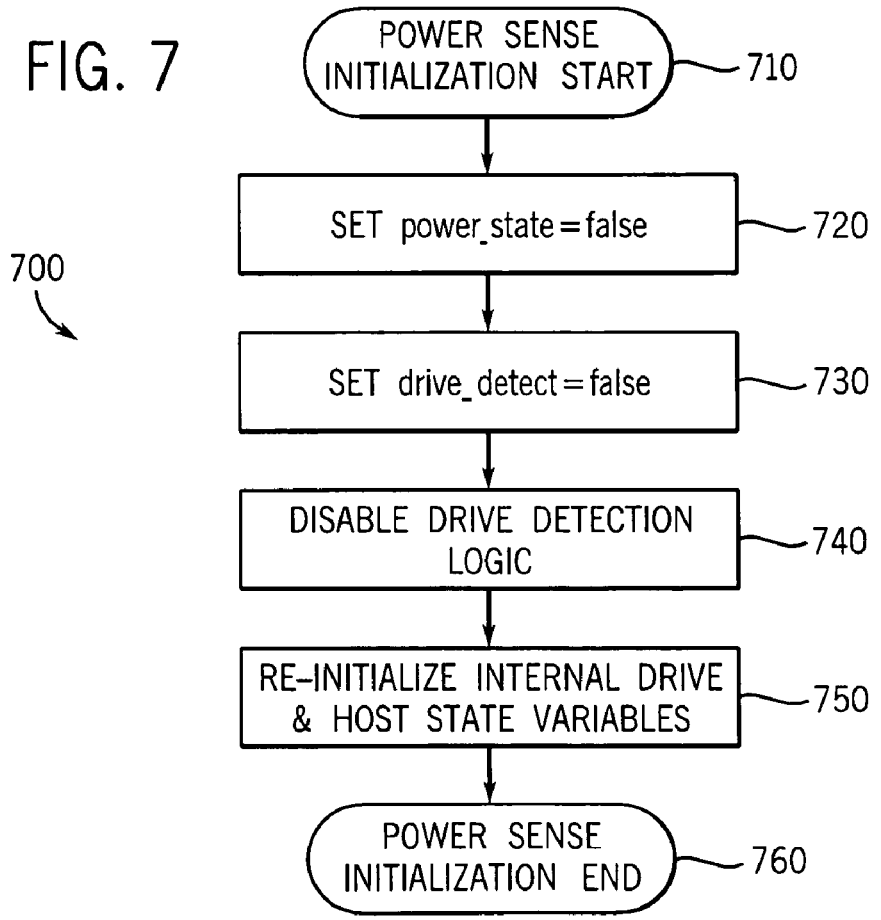
FIG. 7 is a flow diagram of an initialization process according to one or more embodiments of the present invention.
Figure 8:
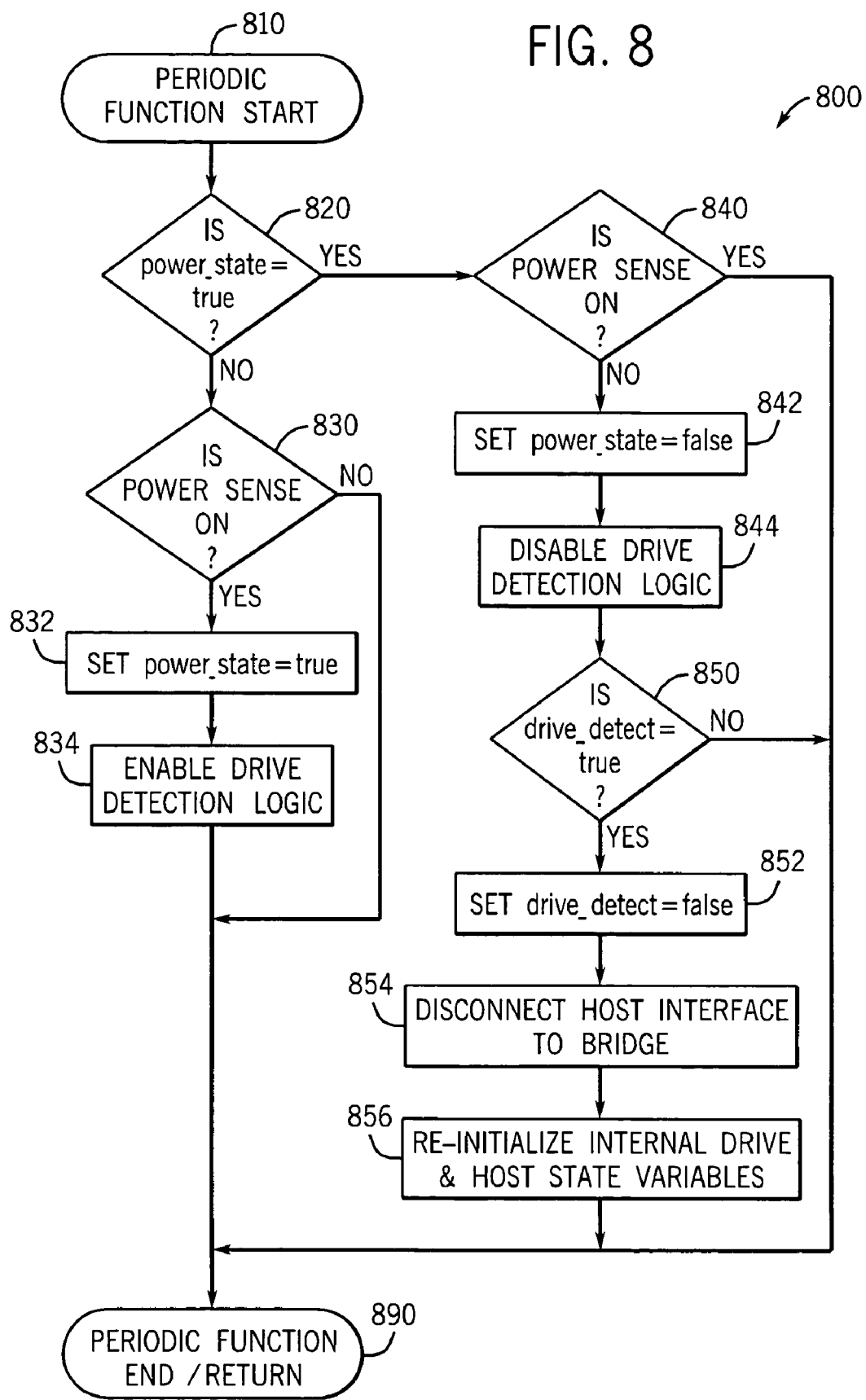
FIG. 8 is a flow diagram of a periodic power sensing process according to one or more embodiments of the present invention.

One or more methods according to embodiments of the present invention are shown in FIGS. 7 and 8. Such methods can also be implemented in computer program products, such as computer software or the like, as will be appreciated by those skilled in the art.

FIG. 7 illustrates an initialization process 700-for initializing the power sensing function of the present invention. The process starts at 710 (for example, when the bridge 110 is first turned on). A power_state parameter is set to "false" at 720 to inform the process that it assumes that no power is on in any of the drive bays that might be monitored by a bridge or the like. Moreover, a drive_detect parameter likewise is set to "false" at 730, again assuming that no hard drive is available for communication. The drive detection logic (for example, of a bridge) is disabled at 740 and all internal drive and host state variables are re-initialized at 750. Typically this re-initialization sets these variables to a default "inactive" state. The power sensing initialization process ends at 760 with the bridge prepared to sense energization of one or more drive bays and/or availability of one or more hard drives for communication, depending on the configuration employed.

FIG. 8 illustrates a remote power detection method or process 800 according to one or more embodiments of the present invention. As indicated in FIG. 8, process 800 can be run periodically or in any other suitable manner to check for drive bay energization from time to time. In some embodiments of the present invention, process 800 can be run several times per second to allow a user with reasonably immediate feedback of energization and other operational indications. For example, running process 800 at a rate of 4 times per second will be adequately responsive to user input without unnecessarily taxing the processor.

Each time process 800 runs, it is checking to determine whether its "internal" view of the energization and drive availability situation matches the physical situation of whatever drive bay (and, perhaps, hard disk) is connected to the process 800. Process 800 commences with its various states set from either a previous iteration of process 800 or from initialization, for example initialization according to process 700 of FIG. 7.

Drive bay energization detection starts at 810 and the power_state variable is checked at 820 to determine whether process 800 currently believes that the monitored drive bay is energized. If the internal indication (that is, the power_state variable) is that no energization is sensed at 820, then process 800 checks at 830 to see whether the bridge currently senses energization via a remote power sensing cable or the like. If the current sensing does not detect energization of a drive bay at 830, then process 800 ends at 890 because no power is actually sensed in the drive bay and the variables of process 800 are correct. If at 830 energization of the drive bay is detected, then process 800 switches its internal power state variable to "true" at 832 and enables drive detection logic at 834 to begin communication with the available drive bay. Thereafter process 800 ends at 890.

If at 820 the internal power state of process 800 is "true" (indicating that process 800 believes that energization is present), then the drive bay's actual power status is checked at 840. If process 800 actually detects power on in the connected drive bay, then the internal view of energization and the actual state are the same and process 800 ends at 890. If no energization is actually detected in the connected drive bay, then at 842 the internal power state variable (that is, the power_state variable) is switched to "false" and the drive detection logic is disabled at 844. If process 800 does not currently believe at 850 that it detects a drive with which to communicate, then again its internal view of the system status and the actual system status match and process 800 ends at 890.

When process 800 finds that drive_detect is true at 850, process 800 sets drive_detect to false at 852, disconnects the interface between the host computer and the bridge (or other device) at 854, and re-initializes the internal drive and host variables at 856. Thereafter, process 800 ends at 890. In each possible sequence of steps through process 800, the variables and/or states of process 800 can end with various configurations that provide a potentially different sequence during the next and following iterations of the process 800.

A method for enabling the bridging function of a hard disk detection device according to the present invention begins with coupling a drive bay to a detection device (such as a bridge) with a power sensor. The drive bay is monitored with the power sensor to determine when the drive bay is energized. The bridging function or other desired operation of the detection device is then enabled after the drive bay has been energized. Monitoring of the drive bay can include monitoring for energization of the drive bay as well as monitoring for the presence of a hard disk in the drive bay. As with the apparatus discussed above, an energization proxy such as a fan can be monitored using a power sensor cable.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A remote power sensing system comprising:
    a hard disk drive bay comprising an energization control configured to selectively provide power to the drive bay;
    a hard disk bridge; and
    a power sensor coupling the energization control to the bridge, the power sensor comprising;
        a bridge rectifier coupled to the energization control; and
        a voltage divider coupled to the bridge rectifier and the bridge;
    wherein the bridging function of the bridge in connection with the drive bay is enabled when the power sensor detects energization of the drive bay.

2. The system of claim 1 wherein the bridge comprises:
    a field programmable gate array coupled to the power sensor; and
    at least one bridge chip coupled to the field programmable gate array.

3. A remote power sensing system comprising:
    a hard disk drive bay comprising an energization control configured to selectively provide power to the drive bay;
    a hard disk bridge; and
    a power sensor coupling the energization control to the bridge;
    wherein the bridging function of the bridge in connection with the drive bay is enabled when the power sensor detects energization of the drive bay;
    further wherein the bridge comprises:
        a field programmable gate array coupled to the power sensor; and
        at least one bridge chip coupled to the field programmable gate array.

4. The system of claim 3 wherein the drive bay further comprises an energization proxy coupled to the energization control, wherein the energization proxy is activated when the energization control provides power to the drive bay;
    further wherein the power sensor is coupled to the energization proxy to detect when the energization control provides power to the drive bay.

5. The system of claim 4 wherein the energization proxy is a drive bay fan unit.

6. The system of claim 3 wherein the hard disk drive bay comprises one of the following:
    an IDE hard disk; or
    a SATA hard disk.

7. The system of claim 3 wherein the power sensor comprises a cable coupling the bridge to the energization control, wherein the cable has a first segment coupling the energization control to an energization proxy, further wherein the cable has a second segment coupling the energization control to the bridge.

8. The system of claim 7 wherein the energization proxy is a drive bay fan unit.

9. A remote power sensing system comprising:
    a hard disk drive bay comprising:
        a power control unit activatable by a key switch to provide power to the drive bay; and
        a fan unit coupled to the power control unit;
    a hard disk bridge comprising:
        a bridging function comprising a bridge chip set, wherein the bridge chip set comprises at least one bridge chip and further wherein each bridge chip in the bridge chip set is configured to couple a hard disk to a host computer;
    a power sensor cable coupled to the drive bay fan unit and to the bridge, wherein the power sensor cable provides a power detection signal to the bridge when power is provided to the drive bay fan unit.

10. The system of claim 9 wherein each bridge chip is configured to communicate with at least one of the following:
    an IDE hard disk; or
    a SATA hard disk.

11. The system of claim 9 wherein the power sensor cable comprises:
    a first segment coupling the bridge to a fan unit power source; and
    a second segment coupling the fan unit power source to the fan unit.

* * * * *